Dec. 7, 1948. K. JELLUM 2,455,495
CASTING REEL
Filed April 5, 1945 2 Sheets-Sheet 2
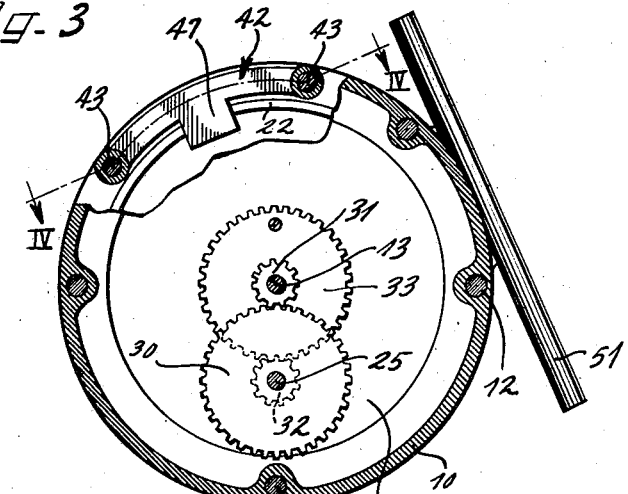
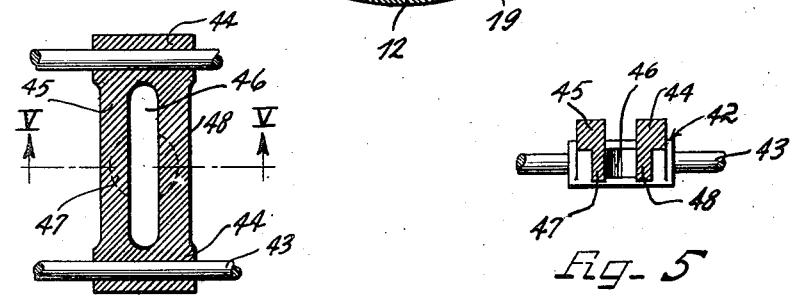
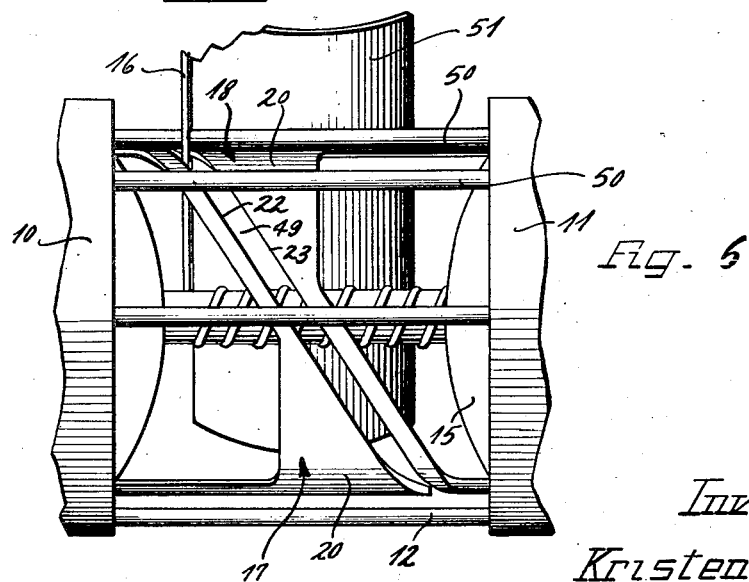
Inventor
Kristen Jellum
by The Firm of Charles H. Kells Attys.

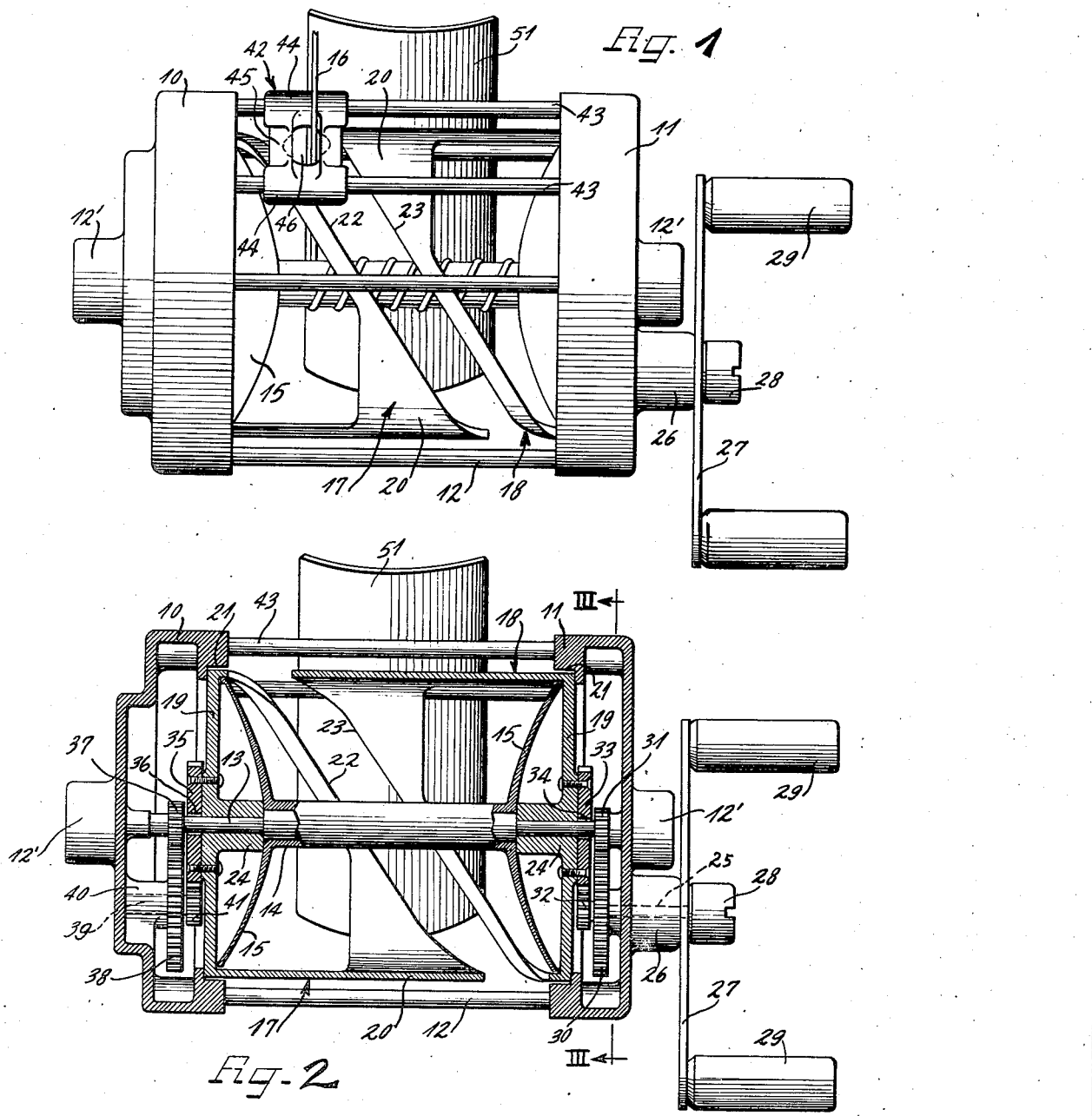

Patented Dec. 7, 1948

2,455,495

UNITED STATES PATENT OFFICE 2,455,495

CASTING REEL

Kristen Jellum, Spooner, Wis.

Application April 5, 1945, Serial No. 586,704

9 Claims. (Cl. 242—84.4)

My invention relates to casting reels for mounting on fishermen's casting rods, the general object of the invention being to produce a reel which will automatically and more efficiently control the fishing line.

An important object of the invention is to provide simplified means on the reel for automatically assuring uniform and level winding and unwinding of the line on the spool.

Another object is to provide improved and simplified guide means for the line reciprocable between the ends of the spool with uniform speed proportionate to the speed of rotation of the spool during winding or unwinding to insure uniform and level winding of the line on the spool and to assure uniform pay-out of the line from the spool.

A further object is to provide simplified cam structure for effecting the uniform reciprocation of the line guiding means.

Still another object is to provide simple and inexpensive transmission connection from the reel crank to the spool and the cam structure for the desired relative speed for assuring the proper winding and unwinding of the line.

The above referred to and other features of my invention are embodied in the structure shown on the drawings, in which:

Figure 1 is a side elevation of the reel structure;

Figure 2 is a diametral longitudinal section thereof;

Figure 3 is a section on plane III—III, Figure 2;

Figure 4 is a section on plane IV—IV, Figure 3;

Figure 5 is a section on plane V—V, Figure 4; and

Figure 6 is a side elevation showing a modified arrangement for guiding the line.

The reel structure shown comprises the generally cylindrical heads 10 and 11 connected together by spacer bars 12. These heads have on their outer sides axial projections 12' in which antifriction bearings (not shown) are housed for the shaft 13 extending through and secured to the hub 14 of the fishline receiving spool, the spool flanges 15 extending from the hub being convexo-concave.

The structure for guiding the line 16 onto and off of the spool comprises a pair of co-operating guide or cam elements 17 and 18 of like formation. Each element comprises a cylindrical end disk or wall 19 and a cylindrical wall or flange 20 extending inwardly from the periphery of the end wall. The end wall 19 of the element 17 is received within the cylindrical recess 21 in the head 10 and the end wall 19 for the element 18 is received in the recess 21 in the head 11. The cylindrical flanges of the elements 17 and 18 receive the end flanges 15 of the spool which terminate at their peripheries adjacent to the end walls 19.

The cylindrical flange or wall 20 of each of the guide elements 17 and 18 is cut off on the bias along a plane at an angle with the flange axis and passing through the inner side of the end wall 19 at one point thereof, thus providing the opposed parallel guide edges 22 and 23 on the inner ends of the flanges 20 of the two elements.

The co-operating guide elements 17 and 18 are rotatable together on the spool supporting shaft 13, the end walls 19 having the bearing projections 24 for receiving the shaft 13 and extending between the end walls and the outer sides of the spool end flanges 15. The spool and the guide elements are rotated at different speeds. Extending through the head 11 of the reel structure at one side of the spool axis is a drive shaft 25 journaled in antifriction bearings (not shown) within the housing 26 on the head 11. A crank lever 27 is secured to the shaft 25 by a nut 28 and has handles or grips 29 extending therefrom. Within the head 11 is a gear 30 secured on the shaft 25 to mesh with a pinion 31 on the adjacent end of the spool shaft 13. On the inner end of the shaft 25 is secured a gear pinion 32 which meshes with the gear 33 secured to the outer side of the end wall 19 of the guide element 18, this gear 33 having a clearance opening 34 for the spool shaft.

Secured against the outer side of the end wall 19 for the guide element 17 is a gear 35 of the same size as the gear 33, a clearance opening 36 being provided in the gear 35 for the spool shaft. Outside of the gear 35 and within the head 10 a gear pinion 37 is secured to the spool shaft 13, this pinion being of the same size as the pinion 31 on the other end of the spool shaft. The pinion 37 meshes with a gear 38 mounted on a shaft 39 journaled in the boss 40 extending from the outer wall of the head 10, this gear 38 being of the same size as the gear 30 on the drive shaft 25. At its inner end the shaft 39 carries the pinion 41 which meshes with the gear 35, this pinion 41 being of the same size as the pinion 32 on the shaft 25. Thus, when the crank lever 27 is turned for rotation of the spool, the guide members 17 and 18 will be rotated at the same speed which speed is less than the speed of rotation of the spool. With the gearing arrangement shown, the gearing ratio is 1:16, the guide elements being rotated only one revolution for each sixteen revolutions of the spool.

In the arrangement shown on Figures 1 to 5, a guide carriage 42 is controlled by the guide elements 17 and 18 for guiding the line 16 during windup or unwinding rotation of the spool. The carriage is mounted on a pair of rods 43 extending between the heads 10 and 11 parallel with the spool axis, the carriage having the heads 44 bored to receive the guide rods or rails 43. A wall or web 45 extends between the heads 44 and has the guide slot 46 therethrough which extends at right angles with the rail rods 43. At opposite sides of the guide slot 46 cam lugs 47, 48 extend radially inwardly. The inner faces of these lugs are in the plane of the inner faces of the guide slot 46 while the outer faces of the lugs are transversely rounded and, as shown, these surfaces are in a cylindrical surface. These lugs project into the path between the parallel guide edges 22 and 23 of the guide elements 17 and 18, the lug 47 engaging at its outer side against the edge 22 and the lug 48 engaging at its outer side against the edge 23. The line 16 extends through the slot 46 and, when the crank 27 is turned for rotation of the spool and the guide elements 17 and 18, the carriage 42 will be reciprocated on the rods 43 with uniform motion for movement of the line with the carriage for guiding the line onto the reel for uniform and even windup thereof, or for guiding the unwinding of the line during pay-out thereof.

In the modified arrangement shown on Figure 6, the guide carriage for the line 16 is omitted and the line is guided directly by the guide elements 17 and 18. The flanges 20 of the guide elements are lengthened in axial direction so as to leave only a narrow guide path 49 between the opposed edges 22 and 23 of the guide elements, and the line extends through this narrow passageway 48 so that when the reel is operated, the line will be moved back and forth between the reel heads with uniform motion. The movement of the line in a direction at right angles to its back and forth movement between the reel heads will be guided by guide rods 50 extending between the heads and between which rods the line passes.

The reel supporting plate 51 for the reel structure is secured to adjacent rods 12, and this plate is of arcuate cross section for engagement at its ends in a mounting structure on a rod, in a manner well understood in the art. The rods 12 and the guide rods for the line surround the guide elements 17 and 18 and the spool and protect them against displacement or injury. In order to make the reel structure lighter, portions of the flanges of the guide elements may be cut away, as shown.

As the reciprocating guiding movement of the line by the guiding elements is uniform, the outer surface of the spool barrel 14 may be cylindrical throughout and the line will be evenly and uniformly wound thereon or unwound therefrom.

I have thus produced an efficient casting reel which can be economically manufactured. I do not, however, desire to be limited to the exact construction and arrangement shown and described, as changes and modifications may be made without departing from the scope of the invention.

I claim as my invention:

1. A casting reel comprising a supporting frame and a spool journaled thereon, a cylindrical guide structure mounted on said frame concentric with and surrounding said spool, said guide structure having an endless camway disposed in a plane at an angle with its axis through which passageway the line on the reel passes to be moved back and forth between the spool ends with uniform motion to be thereby guided for even winding on or unwinding from the spool.

2. A casting reel comprising a supporting frame and a spool journaled thereon, a cylindrical guide structure mounted on said frame concentric with and surrounding said spool, said guide structure having a guide passageway disposed in a plane at an angle with its axis through which passageway the line on the reel passes to be moved back and forth between the spool ends with uniform motion to be thereby guided for even winding on or unwinding from the spool, and guide means on said frame for guiding the movement of the line in a plane at right angles to its back and forth movement.

3. A casting reel comprising a supporting frame, a spool journaled on said frame, a cylindrical guide structure journaled on said frame concentric with and surrounding said spool, a camway around said cylindrical guide structure in a plane at an angle with the axis thereof, a line extending from said spool passing through said camway to be moved back and forth with uniform motion between the ends of the spool, and means for rotating said spool and said guide structure at a speed ratio which will cause even and uniform winding or unwinding of the line during operation of the reel.

4. A casting reel comprising cylindrical heads and spacer bars extending therebetween, a spool journaled by and extending between said heads, a cylindrical guide structure journaled on said frame concentric with and surrounding said spool, the cylindrical wall of said guide structure having a guide passageway in a plane at an angle with the spool axis, a carriage slidable on adjacent spacer bars for reciprocation between said heads and having a cam projection engaging in said cam way, said carriage having a guide slot therethrough, the line on said spool extending therefrom through said cam way and said carriage guideway, and means for rotating said spool and said guide structure with the speed of rotation of the guide structure so proportioned to the speed of rotation of the spool that the reciprocation of said carriage will cause the line to be guided for even winding or unwinding during turning of the spool.

5. A casting reel comprising cylindrical heads, a spool extending between and journaled by said heads concentric therewith, rail bars extending between said heads parallel with the spool axis, a carriage mounted on said rail bars, a guide structure journaled between said heads concentric with and surrounding said spool, said guide structure having a cylindrical wall with a cam way therein in a plane at an angle with the spool axis, a cam lug on said carriage engaging in said cam way, and means for rotating said spool and said guide structure at different speeds whereby said carriage will be reciprocated on said rail bars, the line on said spool extending through said cam way and said carriage to be guided by said carriage for uniform winding or unwinding during rotation of the spool.

6. A casting reel comprising cylindrical frame heads, a shaft journaled in said heads at the axis thereof and a spool supported on said shaft to extend between said heads, a pair of guide elements each comprising a cylindrical end wall journaled on said shaft outside of the respective spool ends and a cylindrical inwardly extending flange, said flanges surrounding the spool ends and being cut off on parallel planes at an angle with the shaft to present opposed edges at their inner ends defining a cam way, rail bars extending between said heads outside of said guide elements and parallel with said shaft, a carriage mounted on said rail bars for reciprocation thereon, a cam abutment on said carriage projecting into said cam way for engagement with said opposed edges whereby when said guide elements are rotated said carriage will be reciprocated with uniform motion between said heads, a crank, driving connection between said crank and said shaft and said guide elements, the line on said spool leading outwardly therefrom through said cam way and said carriage to follow the reciprocation of said carriage, said driving connections being such that the rate of rotation of said guiding elements proportionate to the rate of rotation of said spool will cause said line to be evenly wound up on the spool or unwound therefrom.

7. A casting reel comprising a supporting frame, a shaft extending through said frame and a spool secured thereto, co-operating guide elements each comprising an end wall journaled on said shaft outside of the respective end of the spool and a cylindrical flange extending inwardly from the end wall, said inwardly extending flanges surrounding said spool and being cut away on the bias to provide a cam passageway between their opposed inner edges, a guide carriage mounted on said frame to move thereon in a direction parallel with said shaft and having a guide passageway therethrough, the fishline on said spool extending outwardly therefrom through said cam passageway and said carriage guide passageway whereby when said guide elements are rotated together said carriage will be reciprocated, a crank handle, and driving connection between said crank handle and said shaft and said guiding elements for rotating said guiding elements together but at a speed relative to the speed of rotation of said spool such that when said spool is rotated for winding or unwinding of the line, the line will be guided by said reciprocating carriage to wind up evenly or unwind evenly when the reel is operated.

8. In a casting reel having a supporting frame in which a spool is rotatable for winding or unwinding of a line, a guide carriage reciprocable on said frame between the ends thereof and parallel with the spool axis, said carriage having a guide passageway therethrough, a cam structure concentric with and surrounding said spool and being rotatable on said frame, said cam structure having a cam way therein in a plane at an angle with the spool axis, a cam abutment on said carriage engaging in said cam way whereby, when said cam structure is rotated, said carriage will be reciprocated, the line extending from said spool through said cam way and said guide passageway to follow the reciprocation of said carriage, and means for rotating said spool and said cam structure at such relative rates that said line will be evenly applied to or withdrawn from the spool during operation of the reel.

9. In a reeling mechanism, a supporting frame, a spool journaled thereon, a cylindrical guide structure mounted on said frame concentric with and surrounding said spool, said guide structure affording an endless camway extending around said guide structure and also extending in an axial direction for substantially the effective length of said spool, means for driving said spool, and means for driving said guide structure, whereby a line disposed in said guide passageway may be directed back and forth axially as said spool and said guide structure are rotated.

KRISTEN JELLUM.

REFERENCES CITED

The following references are of record in the file of this patent:

UNITED STATES PATENTS

| Number | Name | Date |
|---|---|---|
| 614,830 | Brownell | Nov. 29, 1898 |
| 828,969 | Rhodes | Aug. 21, 1906 |
| 1,782,358 | Lang | Nov. 18, 1930 |